E. E. LAWRENCE.
MECHANISM AND PROCESS FOR CUTTING FILLED WAFERS.
APPLICATION FILED OCT. 26, 1918.

1,298,520.

Patented Mar. 25, 1919.
6 SHEETS—SHEET 1.

Fig. 1.

Inventor:
Edward E. Lawrence.

E. E. LAWRENCE.
MECHANISM AND PROCESS FOR CUTTING FILLED WAFERS.
APPLICATION FILED OCT. 26, 1918.

1,298,520.

Patented Mar. 25, 1919.
6 SHEETS—SHEET 3.

Inventor:
Edward E. Lawrence,
by Emery, Booth, Janney and Varney
Attys.

E. E. LAWRENCE.
MECHANISM AND PROCESS FOR CUTTING FILLED WAFERS.
APPLICATION FILED OCT. 26, 1918.

1,298,520.

Patented Mar. 25, 1919.
6 SHEETS—SHEET 5.

Inventor:
Edward E. Lawrence.

UNITED STATES PATENT OFFICE.

EDWARD E. LAWRENCE, OF JAMAICA, NEW YORK, ASSIGNOR TO LOOSE WILES BISCUIT COMPANY, OF LONG ISLAND CITY, NEW YORK, N. Y., A CORPORATION OF NEW YORK.

MECHANISM AND PROCESS FOR CUTTING FILLED WAFERS.

1,298,520.  Specification of Letters Patent.  Patented Mar. 25, 1919.

Application filed October 26, 1918.  Serial No. 259,745.

*To all whom it may concern:*

Be it known that I, EDWARD E. LAWRENCE, a citizen of the United States, and a resident of Jamaica, in the county of Queens and State of New York, have invented an Improvement in Mechanism and Processes for Cutting Filled Wafers, of which the following description, in connection with the accompanying drawings, is a specification, like characters on the drawings representing like parts.

This invention relates primarily, but not exclusively, to mechanism for and to the process of cutting filled wafers and other edible products.

In order that the principle of the invention may be readily understood, I have disclosed in the accompanying drawings a single embodiment of my invention and the best form of mechanism whereby the process of my invention may be practised.

The disclosed embodiment of the invention is primarily intended for cutting filled wafers, but the same so far as certain features thereof are concerned is capable of use in other and varying relations.

I have herein represented my invention as applied to or incorporated in a wafer cutting mechanism like that shown in my Patent No. 1,260,555 dated Mar. 26, 1918, but obviously my invention may be embodied in other types of mechanism and is not limited in this respect. For convenience of description merely I have herein disclosed my invention as an improvement upon that shown in my said Patent No. 1,260,555.

In accordance with the preferred embodiment and manner of carrying out my invention, the wafer sheets are superimposed in a suitable pile and are deposited upon or taken by an endless or other carrier, and thence delivered to a gang of parallel cutters by which the wafer sheets are cut through in one direction only, thus forming bars. Obviously, a single sheet instead of a plurality of superposed sheets may be acted upon by the cutters at one time. The wafer sheets thus cut are then preferably automatically turned through ninety degrees and are presented to the second gang of parallel cutters, whereby the wafer bars are separated into wafers.

Figure 1:
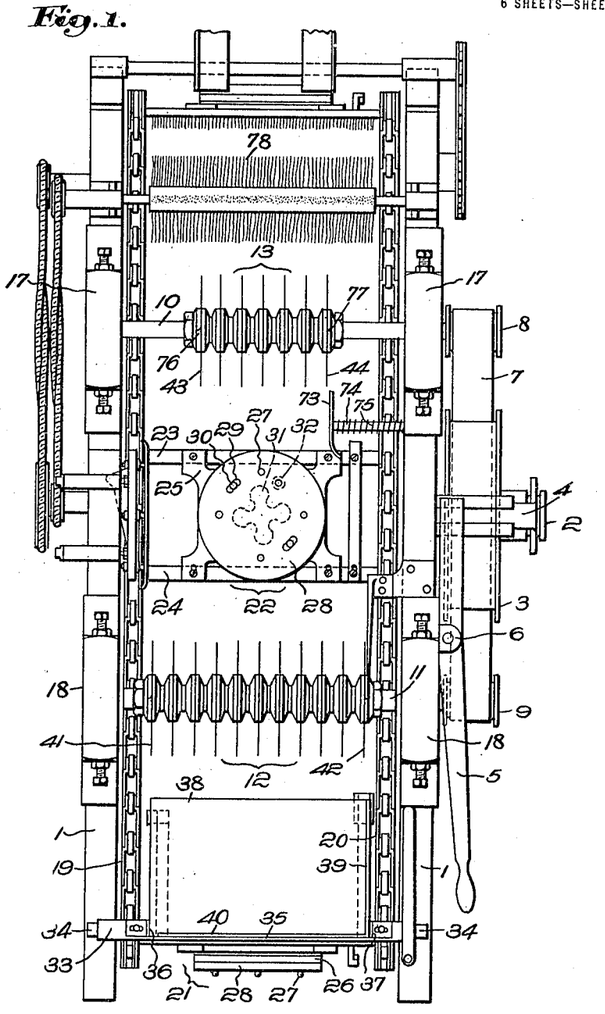
Figure 1 is a plan view of the main or essential parts of a filled wafer cutting mechanism embodying my invention and whereby my process may be practised.
Figure 2:
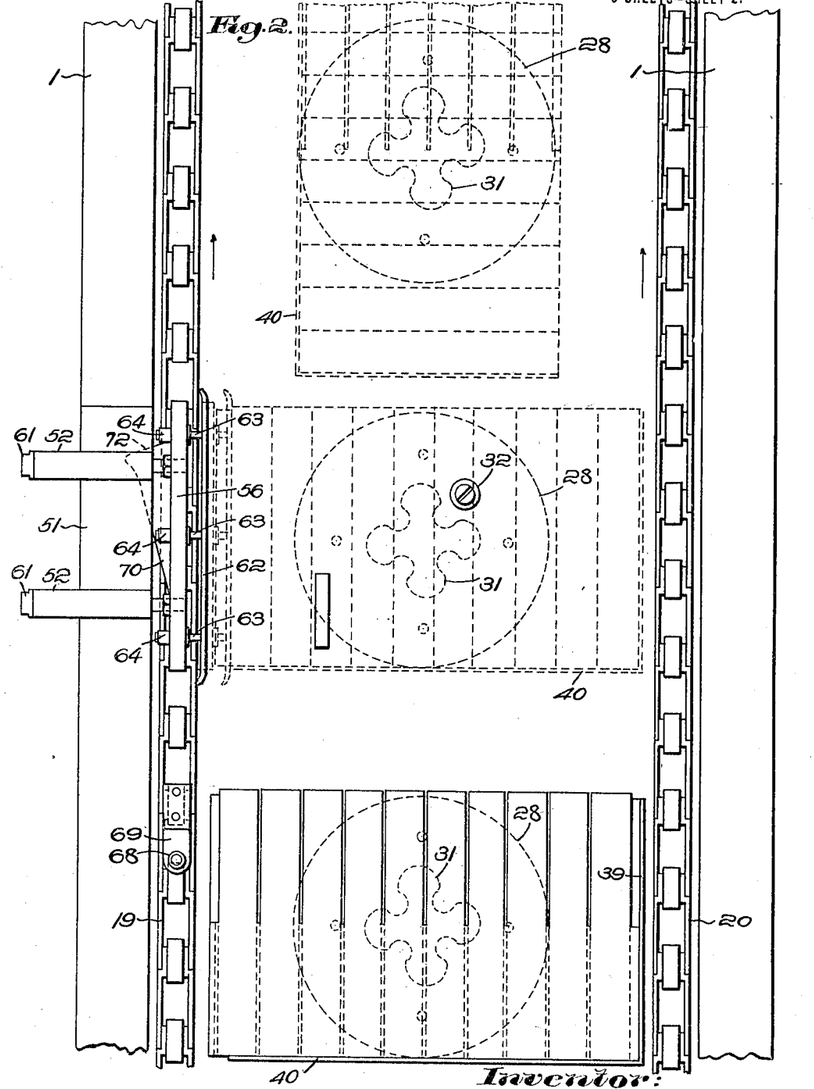
Fig. 2 is a plan view upon an enlarged scale of a portion of the mechanism shown in Fig. 1 and representing certain of the positions of the parts in dotted lines.
Figure 3:
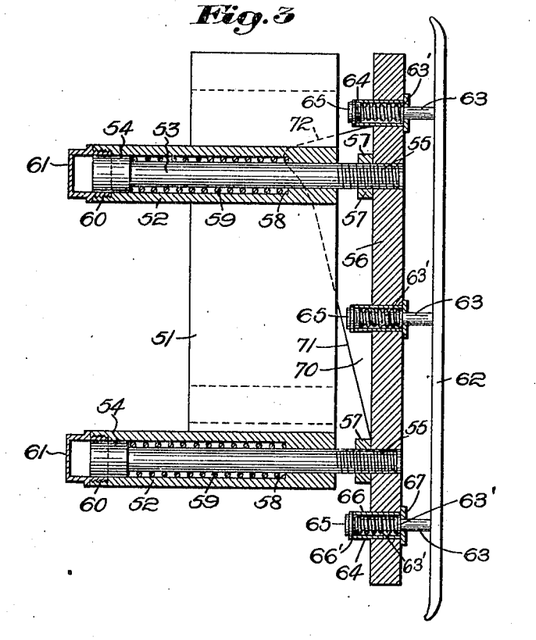
Fig. 3 is a view, mainly in horizontal section, of the means for rectifying or compacting the bars or strips into which the layers or sheets are cut by the first set of cutters.
Figure 4:
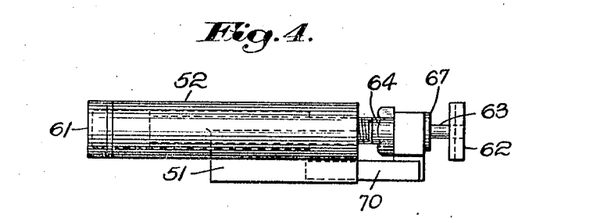
Fig. 4 is an end elevation of the structure shown in Fig. 3.
Figure 5:
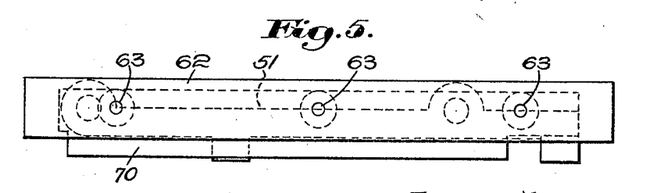
Fig. 5 is a side elevation of the structure shown in Fig. 3.
Figure 6:
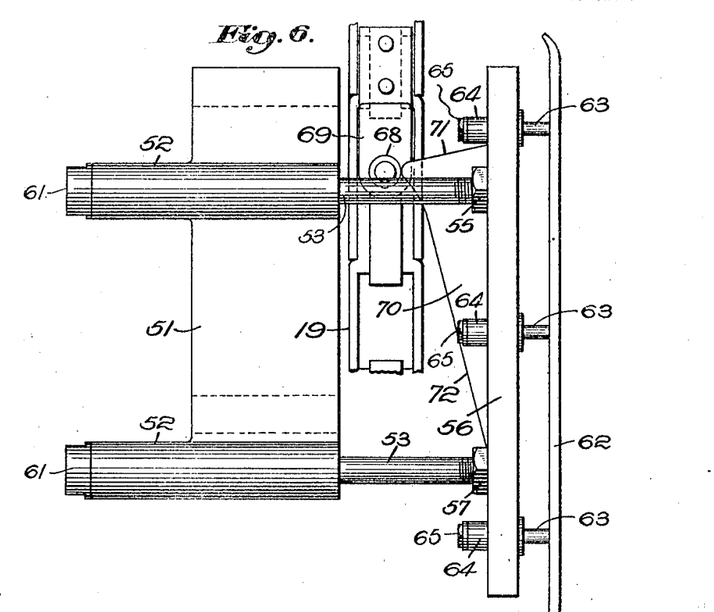
Fig. 6 is a plan view thereof, certain of the parts being shown in dotted lines.
Figure 7:
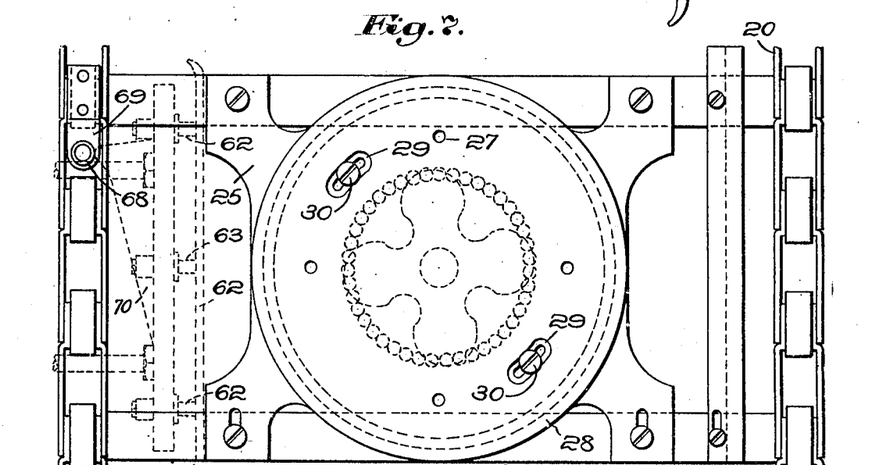
Fig. 7 is a plan view upon an enlarged scale of a portion of the mechanism shown in Fig. 1.

Referring more particularly to the drawings and to that single embodiment and adaptation of my invention and to the single embodiment of means for practising my process, I have in Figs. 1 and 2 represented at 1—1 suitable side frames of the mechanism and between which is supported an electric or other motor, not shown, by which power is transmitted to the various parts to be driven. Any other suitable driving mechanism may, however, be employed. The main drive shaft is represented at 2 in Fig. 1, it being mounted in suitable bearings in the frame and having thereon the driving pulley 3 which is adapted to be clutched to and unclutched from the shaft by a suitable clutching device, as, for example, by the clutch member 4 connected at its upper end to a shifting lever 5 pivoted at 6 upon the framing of the machine. The main driving shaft 2 is driven by a belt or otherwise from the motor, and for that purpose I have represented a belt 7 passing about the pulley of the motor and also about suitable pulleys 8, 9, fast upon shafts 10, 11 which have fast thereon two gangs or sets of cutters 12, 13. The said shafts may be mounted in any suitable manner, as for example, in tubular holders or castings 17, 18 generally similar to those shown in my said patent and not herein necessary more fully to describe. Preferably the construction is such that even though the driving pulley 3 be unclutched from the main shaft the set of cutters 12, 13 continue to be driven.

I provide suitable means which may be and preferably are like those shown in my said Patent No. 1,260,555 for conveying the wafer sheets to and presenting them to the action of the cutters. Therefore, although for this purpose, any suitable means may be provided, I have herein represented two parallel sprocket chains 19, 20 suitably supported upon sprocket gears mounted near the opposite ends of the mechanism and not herein shown. I have not herein indicated the means for driving the said sprocket chains as preferably it is the same as that shown in my said Patent No. 1,260,555.

Preferably and as shown in my said patent I provide the sprocket chains 19, 20 with suitable supports for the piles of wafer sheets. Preferably four such supports are employed, two of which are indicated at 21, 22 in Fig. 1. These supports connect the two chains 19, 20. Each of these supports is, in this embodiment of my invention, so mounted as to receive the material and to present it to one set of cutters and thereafter, as fully disclosed in said patent, to turn through an angle of ninety degrees so as to present the material to a second set of cutters. Preferably for this purpose the sprocket chains 19, 20 are connected by a series of suitable front and rear cross bars 23, 24, adapted to receive the respective supports or turntables, which are preferably of similar construction and which need not be described in detail, since preferably they are like those shown in my said patent. Briefly, I provide for each turntable a lower plate 25 that is secured to each pair of cross bars 23, 24. Overlying the lower plate 25 is an intermediate plate 26 upstanding from which are a suitable number of pins 27, preferably at diametrically opposite points. Mounted upon the plate 26 is a top plate 28 preferably circumferentially adjustable with respect to the plate 26, as by means of circumferential slots 29 and bolts 30.

At its under side each turntable, which is made up of the plates 26, 28, is provided with a star wheel 31, herein shown as having four teeth. Each star wheel of the series is preferably secured as disclosed in my said patent to the respective plate 26.

Normally each turntable is desirably locked from rotation and preferably by means shown in my said patent and not herein indicated. The construction is preferably such that the locking means, such as a bolt, is withdrawn from its socket just prior to the arrival of the turntable at the point where it is to be turned. To effect the turning of each turntable in proper order, I herein provide a stud or roll 32 indicated in dotted lines in Fig. 1, and which is suitably mounted upon the framing of the machine.

If desired and preferably I provide a series of pans or holders, each of which is adapted to be taken by one of the turntables from a position of rest and by which it is carried past and subjected to the action of the cutters and finally discharged from the mechanism.

In this respect I may provide substantially the mechanism shown in my said patent, but I am not limited thereto.

For that purpose I have herein shown a bar 33 having suitable pivot pins received in ears 34 upstanding from the upper face of the frame members 1—1 near the feeding-in end of the machine. The said bar 33 has upstanding from its upper face at its rear edge an angle piece 35 extending longitudinally of the bar 33 and two transverse end angle pieces 36, 37 preferably adjustably secured to accommodate different sizes of pans or holders.

Upon the cross bar 33 and supported thereby I position a pan or holder 38, preferably having four holes, the relative position of which is the same as the relative position of the pins 27 of each turntable. As more fully disclosed in my said patent, the construction is such that as each turntable comes into proper position, it through suitable means rocks the bar 33 and thus depresses the pan or holder 38 so as to permit the leading pin 27 to enter the foremost hole of the pan or holder. This draws the pan or holder from its support and the other pins 27 enter the holes provided therefor and firmly support the pan or holder in position.

The pan 38 is provided with one upstanding edge 39 extending longitudinally of the mechanism, that is, from the front to the rear of the pan, and also with a transverse upstanding rear edge 40, the other two edges of the pan or holder being unprovided with upstanding portions. This construction permits the wafer sheets, if a plurality are used, to be readily and properly piled in register upon each pan 38, the said wafer sheets being inserted from the front or open side and pushed into the angle formed by the meeting upstanding edges 39, 40.

The pan or holder 38 having been engaged by one of the turntables, is thereby carried beneath the set or gang of rotary cutters 12, and the wafer sheets thereon are longitudinally slitted from their front to their rear edges into bars.

In my said Patent No. 1,260,555, I disclosed a construction wherein at least one of the end rotary cutters of each gang or set of cutters entered the wafer sheets near the lateral edges thereof and so that in cutting the sheets into bars there was formed one or two edge narrow scraps which in practice fell from the pan or holder. In the construction shown in said patent, the scrap at the extreme left hand lateral edge fell from the open lateral edge of the pan or holder onto a shield and that severed from the sheet at the right hand edge thereof was removed by a blade designed to ride under the scrap and so lift it up that it might be subsequently deposited on the said shield.

While such construction was found to be operative and practicable, it did not give wholly satisfactory results and one of the important purposes of my present invention is the provision of suitable means for disposing of the scrap. I have through a period of long experimentation employed various adjunctive devices to coöperate with the rotary blades rotating at a very high rate of speed and which adjunctive devices were intended to remove the scrap therefrom quickly and cleanly and in such a way as not to interfere with the orderly onward movement of the bars. Such adjunctive devices have, however, tended to complication of parts and moreover have not operated with sufficient speed and certainty to permit the desired high rate of speed at which I drive the rotary cutters. As the final result, however, of such period of experimentation, I have instead of employing such adjunctive devices so shaped the endmost rotary cutters of the set of cutters 12 (and also preferably the corresponding cutters of the set 13) that the cutters themselves separate the scrap and not only separate the scrap but simultaneously reduce the same to a pulverized or comminuted condition, thus avoiding the former subsequent step of comminuting or pulverizing the scrap removed by the mechanism shown in my said patent. Such comminution or pulverization is necessary in order to reduce the scrap to a condition fitting it for use. Therefore by my present invention I not only more satisfactorily remove the scrap but I at the same time and by the same act reduce it to the desired form and save a step in the subsequent operation.

Figure 8:
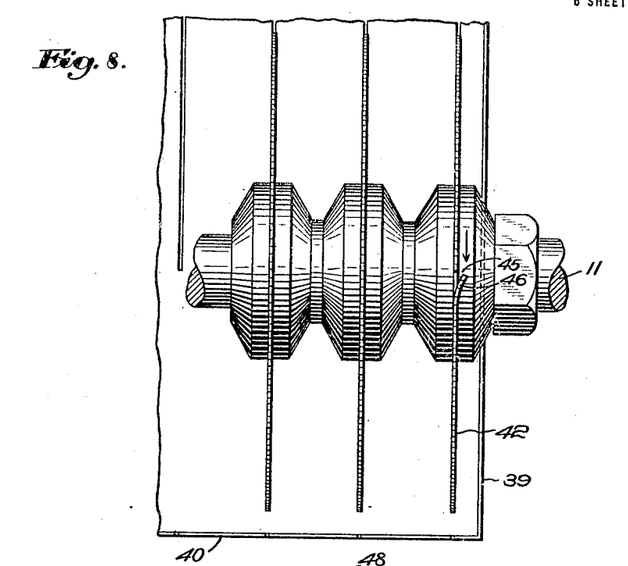
Fig. 8 is a detail partially in plan of the cutters preferably employed for severing the sheets into bars.
Figure 9:
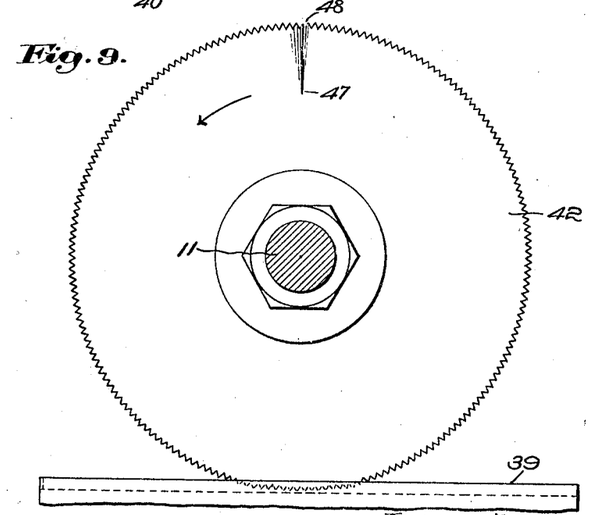
Fig. 9 is a side elevation of one of the end cutters shown in Fig. 8.
Figure 10:
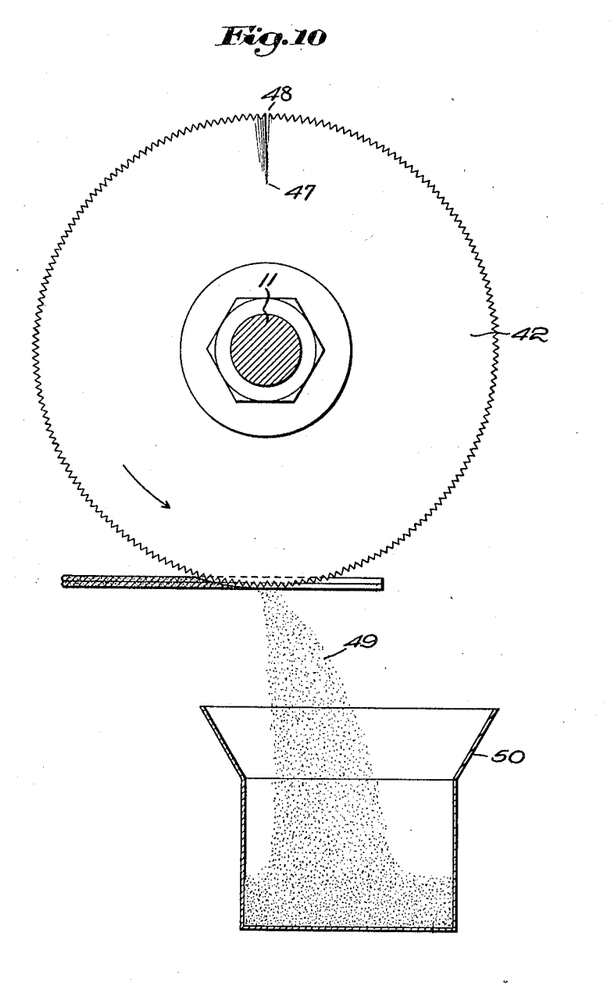
Fig. 10 is a similar view, but diagrammatically indicating the carrying out of my process, and whereby the edge strips cut from the sheets and bars are pulverized.

In Fig. 1, the two end cutters 41, 42 of the first set of cutters 12 and the two end cutters 43, 44 of the second set of cutters 13, and in Figs. 8, 9 and 10 the right hand end cutter 42 of the first set of cutters, all are represented as having a slit 45 extending preferably radially inward a short distance, one of the lips 46 of the said slit being deflected slightly outwardly and also gradually from the plane of the disk or cutter at the point 47 to the periphery of the said cutter at 48 where is the point of greatest deflection. This construction is such as to present an abutment which in the high speed of revolution of the cutters actually intermittently but substantially continuously in the practical operation of the mechanism and consequent upon the exceedingly high speed at which the cutters are rotated, strikes a series of very rapid blows upon the scrap and instantly pulverizes the same as indicated at 49 in Fig. 10, so that it is discharged into a suitable receptacle 50.

The rotary cutter 42 operating at high speed encounters the sheets and the deflected portion 46 thereof strikes the part of the sheet lying outside of the cutter and immediately severs it from the sheet and comminutes or pulverizes it, discharging it into the receptacle 50.

If desired, the supports for the sheets may be slitted to receive the cutters, but preferably the location of them is such that the sheets are cut through without penetrating the support. Preferably the cutters are provided with saw teeth, but within the scope and purpose of my invention the cutting edge may be smooth.

As hereinafter more fully described, the right and left end cutters upon the second set of rotary cutters 13 are provided with similar deflected portions to remove the waste from the bars as they are transversely severed into the ultimate product, but my invention is not limited in this respect.

The continued onward movement of the turntable with its pan or holder 38 carries the same past the first series of rotary cutters 12, bringing them into the position where the turntable is turned through ninety degrees, after which the turntable is carried beneath the second series of rotary cutters 13.

In my said Patent No. 1,260,555, I disclosed means whereby the strips or bars into which the sheets are severed by the first set of rotary cutters are shifted transversely, compacted or rectified, so as to bring all the strips or bars into edge contact and with the right hand strip or bar in contact with the upstanding edge of a pan or holder upon the turntable. I have provided improved and simplified means for effecting this result, which I will now describe.

Referring more particularly to Figs. 3 to 6 inclusive, I have therein represented the frame of the machine as provided at the left hand side thereof viewing Fig. 2 with a plate 51 having formed therewith or secured thereto a pair of sockets 52, 52, wherein are received spindles or bolts 53 headed as indicated at 54 and threaded at their opposite ends 55 where they are tapped into a preferably metallic member 56, and wherein they are suitably secured by bolts 57 or otherwise. Between the heads 54 and the internal shoulders 58 of said sockets are received coil springs 59 tending constantly to move the member 56 toward the left viewing Fig. 3, that is, away from the path of the sheets or bars. The outer ends of said sockets are tapped as indicated at 60 for the reception of caps 61, thus permitting a ready assemblage of the parts.

Carried by the member 56 is a second or blade-like member 62 which is adapted to engage with the edge of the left hand bar and upon inward movement to rectify the bars. While within the scope and purpose of my invention the said blade-like member 62 may be rigidly connected with the member 56, I preferably connect it thereto in some suitable manner so as to permit it to yield if necessary upon meeting an object. While any suitable means may be provided to this end, I have herein represented the blade-like member 62 as having rigid therewith and extending outwardly therefrom three pins or short spindles 63 which are received in sockets 64 that are themselves positioned in openings in the bar 56 and are provided with threaded caps 65. The pins or spindles 63 which are provided with annular shoulders 63' midlength thereof have heads 66' at their outer ends. Within the sockets 64 are provided coil springs 66 surrounding the pins or spindles 63 between said heads and shoulders, thereby holding the blade-like member 62 yieldingly in its inward position, but permitting the same to yield outwardly. In order to cause the rectifying or compacting means to act and preferably just before or as each turntable reaches its turning position after the sheets have been severed into bars or strips, I provide suitable means which herein consists of a roller 68 upon a bracket 69 that is secured to the chain 19. In the onward movement of the chains in the direction of the arrow in Fig. 2, the roll 68 encounters suitable means carried by or associated with the member 56 so as to push it laterally inward or to the right, viewing Fig. 6. For this purpose I have provided a cam 70, which may be of suitable form but which is preferably provided with a steep initial or front face 71 and a more gently sloping rear face 72, the construction being such that in the onward travel of the chains 19, 20 the member 56 and the blade-like member 62 carried thereby are moved abruptly and at a right line inward so as to contact lengthwise with the edge of the outermost bar of the severed superimposed sheets, or of the single sheet as the case may be, and to push them toward the right so as to compact them and take up the spaces incident to the severance of the superposed sheets into bars. The more gently sloping rear face 72 of the cam 70 permits the member 56 and the blade-like member 62 to move more slowly outward under the influence of the springs 59, thereby preventing undue jar. In my prior Patent No. 1,260,555, the rectifying means is moved inwardly along an arcuate path and not by a right line movement. By moving the rectifying means by a right line movement, I avoid a wiping action that may interfere with the proper forward feeding of the wafers or the outer bar of the series of wafer bars.

It is evident that the rectifying or compacting means may be positioned at any suitable point where the bars may be rectified prior to being turned into position for transverse severance into the ultimate products.

It is evident, moreover, that the rectifying means may be employed in other types or forms of mechanism as for example in mechanisms wherein sheets are severed into a plurality of longitudinally extending bars and are not thereafter severed transversely either subsequent to a turning movement thereof or otherwise. Preferably, however, the rectifying or compacting means herein employed is used in connection with means whereby the strips or bars are turned through ninety degrees preliminarily to being cut into the ultimate product.

Therefore preferably I provide means such as shown in said Patent No. 1,260,555, whereby just subsequent to the action of the rectifying or compacting means the continued onward movement of each turntable causes the temporary unlocking of the turntable. Almost simultaneously with but preferably slightly subsequent to the unlocking of the turntable the star wheel 31 engages the stud or roller 32 and thereupon turns the turntable with its pan or holder 38, from the intermediate dotted line position shown in Fig. 2 into the dotted line position shown at the upper end of the sheet (Fig. 2). Immediately upon the turning of the said table through ninety degrees, the bolt preferably provided enters the next socket and the turntable is again locked.

If desired and as shown in my said Patent No. 1,260,555, I may provide at the side of the frame opposite the rectifying or compacting means the guide 73 having a rear curved end to engage the adjacent end of the bars and to guide them to the second set of cutters 13. Preferably the said guide is yielding, being mounted upon a spindle 74 which is yieldingly projected forwardly by the coil spring 75. The continued onward movement of each turntable and its plate or holder carries the strips or bars beneath the second series of rotary cutters 13, which sever them into their final wafer form.

Preferably but not necessarily the endmost cutters 43, 44 of the said second series of rotary cutters are provided with deflected portions 76, 77 similar to those provided upon the cutters 41, 42 and acting in a similar manner to remove any strip and to comminute or pulverize the same and discharge it into a suitable receptacle in the manner indicated in Fig. 10.

As the severed wafers emerge from beneath the second set of rotary cutters, they may be if desired subjected to the action of a rotary or other brush 78, as shown in my said patent, and thereafter they may be removed from the mechanism substantially as indicated in said patent or in any suitable manner.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Sheet cutting mechanism comprising in combination, means to sever the sheet into strips, rectifying means for the severed strips, and means to impart rectifying movement in a right line to said rectifying means.

2. Sheet cutting mechanism comprising an endless carrier, coöperating means to sever the sheet into bars, a rectifier for the bars, and means for moving said rectifier in a right line that is normal to the path of the endless carrier.

3. Sheet cutting mechanism comprising a support for the sheet, means to sever the same into bars, a rectifier for the severed bars, and a cam and co-acting means to move the rectifier.

4. Sheet cutting mechanism comprising a sheet support, means to sever the sheet into bars, a rectifier for the said bars, a cam and co-acting means to move the rectifier in one direction, and a spring to move the rectifier in the opposite direction.

5. Sheet cutting mechanism comprising in combination, a sheet support, coöperating means to sever the sheet into strips or bars, a rectifier for the strips or bars, and means to impart a relatively quick rectifying movement and a relatively slow return movement to the rectifier.

6. Sheet cutting mechanism comprising in combination, a sheet support, coöperating means to sever the sheet, and a rectifier having means to cause it normally to engage yieldingly the severed sheet.

7. Sheet cutting mechanism comprising, in combination, a sheet support, severing means therefor, and a rectifier for the severed sheet having means to push it in one direction but with capacity to yield outwardly.

8. Sheet cutting mechanism comprising in combination, a traveling carrier for the sheet, means to sever the sheet, a rectifier plate for the severed sheet having a cam movable therewith, and a lug on the carrier to engage said cam.

9. Sheet cutting mechanism comprising in combination, a traveling carrier to support the sheet, severing means for the sheet, a rectifier, a cam movable therewith, a lug on the carrier to engage said cam, and a spring to move the rectifier in the opposite direction.

10. Sheet cutting mechanism comprising a traveling carrier to support the sheet, means to sever the sheet, a rectifier for the severed sheet, a cam movable with the rectifier, a lug upon the carrier to engage the cam, and a spring to permit yielding movement of the rectifier toward the severed sheet.

11. Sheet cutting mechanism having a support for the sheet and a cutter having a portion of its cutting edge laterally deflected to engage and remove the waste portion from the severed sheet.

12. Sheet cutting mechanism having a sheet support, and a co-acting rotary cutter, the cutting edge whereof is provided with a laterally deflected portion to engage scrap severed from the edge of the sheets.

13. Sheet cutting mechanism comprising a sheet support and a co-acting cutter slit from the outer edge thereof inward and bent out of the plane of the cutter to present a deflected portion to the sheet.

14. Sheet cutting mechanism including a sheet support, a rotary cutter, and means to impart relative movement thereto to effect feeding of the sheet with respect to the cutter, said cutter having means to comminute the edge scrap portion severed by the cutter from the sheet.

15. Sheet cutting mechanism comprising sheet supporting means to impart onward movement thereto, and a rotary cutter to sever the sheet into bars, said rotary cutter having means to comminute the edge scrap portion of the sheet.

16. That method of treating sheets which comprises severing the same into bars and simultaneously removing and pulverizing an edge portion from the sheet.

17. That method of treating sheets composed of food products which comprises severing the same into bars and simultaneously removing and comminuting the outer edge portions at each side of the sheet.

18. Sheet severing mechanism comprising a sheet support and a gang of cutters therefor to sever the sheets into bars, the outer members of said gang of cutters having portions of their cutting edges laterally deflected.

In testimony whereof, I have signed my name to this specification.

EDWARD E. LAWRENCE.

Witnesses:
JAMES W. PUDNEY,
AUGUST WM. FREES.